US 010800285B2

(12) United States Patent
Rich et al.

(10) Patent No.: US 10,800,285 B2
(45) Date of Patent: Oct. 13, 2020

(54) SYSTEM TO MODULATE SWITCH RESISTANCES WITHIN A BATTERY SYSTEM

(71) Applicant: GM Global Technology Operations LLC, Detroit, MI (US)

(72) Inventors: Dave G. Rich, Sterling Heights, MI (US); Lyall K. Winger, Waterloo (CA); Saad Hasan, Detroit, MI (US); Varsha K. Sadekar, Detroit, MI (US); Robert A. De Stefano, Macomb, MI (US); Gary W. Gantt, Jr., Chesterfield Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 68 days.

(21) Appl. No.: 16/290,541

(22) Filed: Mar. 1, 2019

(65) Prior Publication Data
US 2020/0276911 A1    Sep. 3, 2020

(51) Int. Cl.
*B60L 58/19* (2019.01)
(52) U.S. Cl.
CPC .................... *B60L 58/19* (2019.02)
(58) Field of Classification Search
CPC ............... B60L 58/19; H02J 2207/20
See application file for complete search history.

(56) References Cited

U.S. PATENT DOCUMENTS 5,684,690 A * 11/1997 Levedahl ............... B63H 23/24
                                                    290/4 R
6,909,201 B2    6/2005 Murty et al.
9,184,582 B2   11/2015 Koch et al.
9,440,600 B2 *  9/2016 Koch .................... B60L 3/0046
9,911,249 B2    3/2018 Koch et al.
2019/0043276 A1  2/2019 Conell et al.
2020/0152938 A1* 5/2020 Winger .................. H01M 2/14

FOREIGN PATENT DOCUMENTS

WO    WO-2018/174864 A1    9/2018

OTHER PUBLICATIONS

U.S. Appl. No. 16/013,254, filed Jun. 20, 2018, Rich et al.
U.S. Appl. No. 16/034,782, filed Jul. 13, 2018, Conell et al.
U.S. Appl. No. 16/053,073, filed Aug. 2, 2018, Conell et al.
U.S. Appl. No. 16/183,803, filed Nov. 8, 2018, Winget et al.
U.S. Appl. No. 16/183,895, filed Nov. 8, 2018, Rich et al.
U.S. Appl. No. 16/184,126, filed Nov. 8, 2018, Winger et al.
U.S. Appl. No. 16/275,809, filed Nov. 14, 2019, Winger et al.
U.S. Appl. No. 16/290,457, filed Mar. 1, 2019, Winger et al.

* cited by examiner

*Primary Examiner* — Jared Fureman
*Assistant Examiner* — Duc M Pham

(57) ABSTRACT

In an example, a battery control system is disclosed. The battery control system can include a plurality of batteries, a first terminal, a second terminal, and a third terminal. The battery control system also includes a plurality of switches configured to connect a first battery of the plurality of batteries to and from the first terminal and the third terminal and to connect a second battery of the plurality of batteries to and from the second terminal and the third terminal. The battery control system also discloses a switch resistance modulation module configured to modulate a resistance of at least one switch of the plurality of switches between zero ohms and infinity ohms based on a battery parameter and a control signal.

20 Claims, 8 Drawing Sheets

SYSTEM TO MODULATE SWITCH RESISTANCES WITHIN A BATTERY SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and more particularly to battery systems of vehicles.

Some types of vehicles include only an internal combustion engine that generates propulsion torque. Other types of vehicles include a battery system and one or more electric motors. Hybrid vehicles include both an internal combustion engine and one or more electric motors. Certain vehicle loads operate more efficiently at higher voltages, and other vehicle loads operate more efficiently at lower voltages.

SUMMARY

In an example, a battery control system is disclosed. The battery control system can include a plurality of batteries, a first terminal, a second terminal, and a third terminal. The battery control system also includes a plurality of switches configured to connect a first battery of the plurality of batteries to and from the first terminal and the third terminal and to connect a second battery of the plurality of batteries to and from the second terminal and the third terminal. The battery control system also discloses a switch resistance modulation module configured to modulate a resistance of at least one switch of the plurality of switches between zero ohms and infinity ohms based on a battery parameter and a control signal.

In other features, the switch resistance modulation module is configured to modulate the resistance of the at least one switch to direct current flow between the first battery and the second battery.

In other features, the switch resistance modulation module is configured to modulate the resistance of the at least one switch to mitigate lithium plating.

In other features, the control signal is generated by an engine control module.

In other features, the switch resistance modulation module is further configured to verify one or more operating conditions corresponding to the battery, wherein the verification is based on a comparison of the battery parameters to a predetermined threshold.

In other features, the plurality of switches comprise at least one of an insulated gate bipolar transistor (IGBT) or a field effect transistor (FET).

In other features, the switch resistance modulation module includes a first look-up table that indexes current values associated with the first battery and a second look-up table that indexes current values associated with the second battery.

In other features, the switch resistance modulation module is configured to generate a modulation signal based on a least common value between the first look-up table and the second look-up table.

In an example, a battery control system is disclosed. The battery control system includes a plurality of batteries, a first terminal, a second terminal, and a third terminal. The battery control system also includes a plurality of switches configured to connect a first battery of the plurality of batteries to and from the first terminal and the third terminal and to connect a second battery of the plurality of batteries to and from the second terminal and the third terminal. The battery control system also includes a switch resistance modulation module configured to modulate a resistance of at least one switch of the plurality of switches between zero ohms and infinity ohms based on a battery parameter and a control signal. The switch resistance modulation module includes a first look-up table that indexes current values associated with the first battery and a second look-up table that indexes current values associated with the second battery, wherein the switch resistance module is configured to modulate the resistance according to a least common value based on the current values indexed in the first look-up table and the current values indexed in the second look-up table.

In other features, the switch resistance modulation module is configured to modulate the resistance of the at least one switch to direct current flow between the first battery and the second battery.

In other features, the switch resistance modulation module is configured to modulate the resistance of the at least one switch to mitigate lithium plating.

In other features, the control signal is generated by an engine control module.

In other features, the switch resistance modulation module is further configured to verify one or more operating conditions corresponding to the battery, wherein the verification is based on a comparison of the battery parameters to a predetermined threshold.

In other features, the plurality of switches comprise at least one of an insulated gate bipolar transistor (IGBT) or a field effect transistor (FET).

In an example, a method is disclosed. The method includes receiving a battery parameter, receiving a control signal, and modulating a resistance of at least one switch of a plurality of switches between zero ohms and infinity ohms based on the battery parameter and the control signal. The plurality of switches are configured to connect a first battery of a plurality of batteries to and from a first terminal and a third terminal and to connect a second battery of the plurality of batteries to and from a second terminal and the third terminal.

In other features, the method includes modulating the resistance of the at least one switch to direct current flow between the first battery and the second battery.

In other features, the modulating the resistance of the at least one switch mitigates lithium plating.

In other features, the control signal is generated by an engine control module.

In other features, the method includes verifying one or more operating conditions corresponding to the battery by comparing the battery parameters to a predetermined threshold.

In other features, the plurality of switches comprise at least one of an insulated gate bipolar transistor (IGBT) or a field effect transistor (FET).

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure is directed to a battery control system for modulating a switch resistance based on battery parameters and control signals generated by one or more vehicle control modules. In an example implementation, a battery associated with the battery control system includes multiple sets of output terminals for outputting respective voltages. For example, the battery includes one or more first sets output terminals on a housing of the battery for outputting a first operating voltage (e.g., 12 V or 48 V) and one or more sets of second output terminals on the housing for outputting a second operating voltage (e.g., 12 V or 48 V). The battery can include a plurality of switches to control the operating voltages output to the terminals. The battery control system can also include a switch resistance modulation module can modulate a resistance of one or more switches according to measured battery parameters and/or control signals generated by one or more vehicle control modules.

For example, the switch resistances can be dynamically modulated to mitigate undesirable conditions within the battery system, such as lithium plating, thermal runaway, or the like. Additionally, the switch resistances can be dynamically modulated to ensure battery power limits are adhered to, provide battery cell warming in specified environments, and provide real-time verification of one or more parameters within the battery system.

Figure 1:
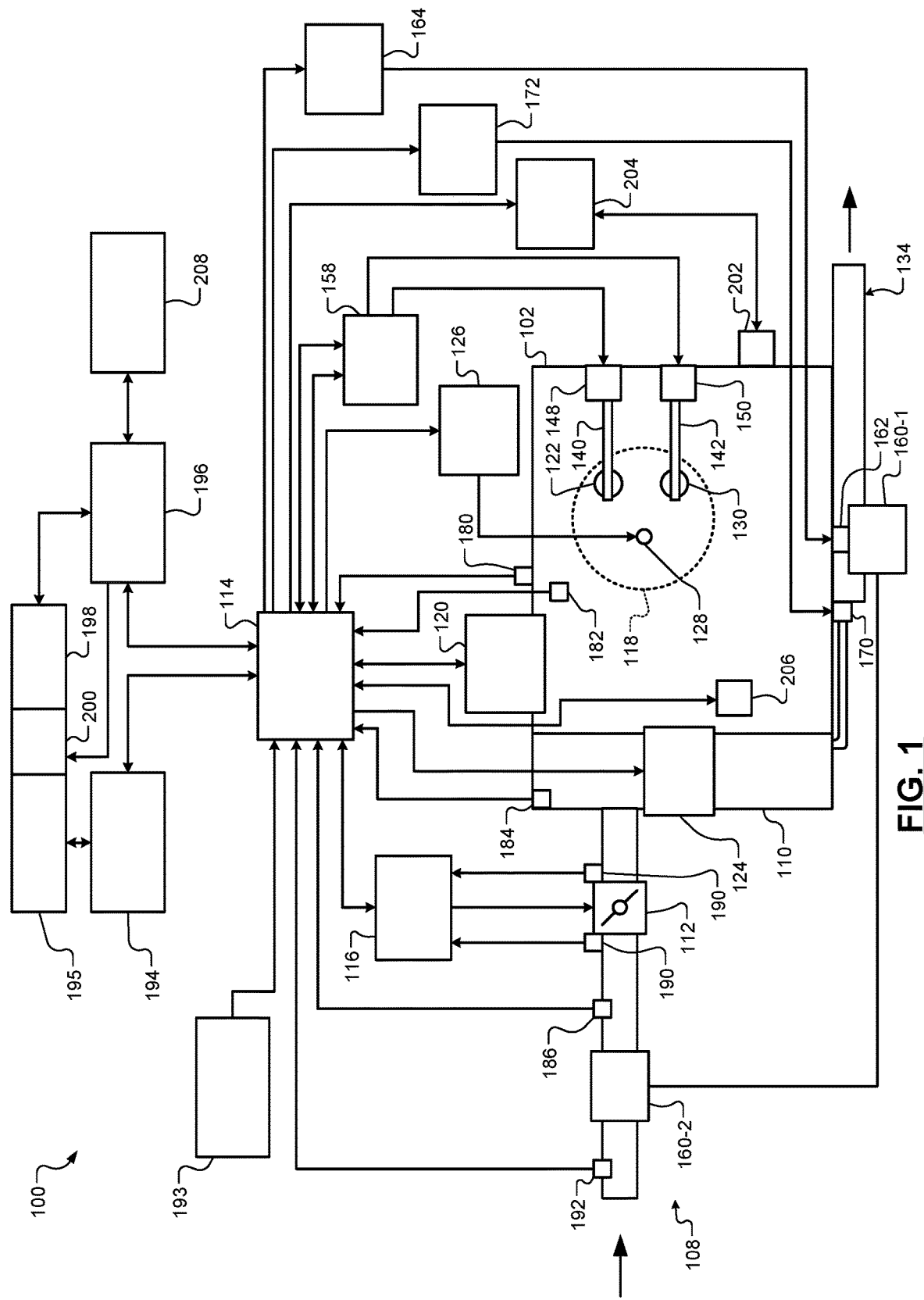
FIG. 1 is an example block diagram of a powertrain system in accordance with an example implementation of the present disclosure.

Referring to FIG. 1, a functional block diagram of an example powertrain system 100 is presented. The powertrain system 100 of a vehicle includes an engine 102 that combusts an air/fuel mixture to produce torque. The vehicle may be non-autonomous or autonomous.

Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft-based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine 102 may include zero, one, or more than one boost device that provides pressurized air to the intake manifold 110. For example, FIG. 1 shows a turbocharger including a turbocharger turbine 160-1 that is driven by exhaust gases flowing through the exhaust system 134. A supercharger is another type of boost device.

The turbocharger also includes a turbocharger compressor 160-2 that is driven by the turbocharger turbine 160-1 and that compresses air leading into the throttle valve 112. A wastegate (WG) 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162.

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine 102 may include an exhaust gas recirculation (EGR) valve 170, which selectively redirects exhaust gas back to the intake manifold 110. The EGR valve 170 may receive exhaust gas from upstream of the turbocharger turbine 160-1 in the exhaust system 134. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. One or more other sensors 193 may also be implemented. The other sensors 193 include an accelerator pedal position (APP) sensor, a brake pedal position (BPP) sensor, may include a clutch pedal position (CPP) sensor (e.g., in the case of a manual transmission), and may include one or more other types of sensors. An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The other sensors 193 may also include one or more acceleration sensors that measure longitudinal (e.g., fore/aft) acceleration of the vehicle and latitudinal acceleration of the vehicle. An accelerometer is an example type of acceleration sensor, although other types of acceleration sensors may be used. The ECM 114 may use signals from the sensors to make control decisions for the engine 102.

The ECM 114 may communicate with a transmission control module 194, for example, to coordinate engine operation with gear shifts in a transmission 195. The ECM 114 may communicate with a hybrid control module 196, for example, to coordinate operation of the engine 102 and an electric motor 198. While the example of one electric motor is provided, multiple electric motors may be implemented. The electric motor 198 may be a permanent magnet electric motor or another suitable type of electric motor that outputs voltage based on back electromagnetic force (EMF) when free spinning, such as a direct current (DC) electric motor or a synchronous electric motor. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests.

Under some circumstances, the hybrid control module 196 controls the electric motor 198 to output torque, for example, to supplement engine torque output. The hybrid control module 196 may also control the electric motor 198 to output torque for vehicle propulsion at times when the engine 102 is shut down.

The hybrid control module 196 applies electrical power from a battery 208 to the electric motor 198 to cause the electric motor 198 to output positive torque. The battery 208 according to the principles of the present disclosure includes one or more adjustable battery systems as discussed below in more detail. The electric motor 198 may output torque, for example, to an input shaft of the transmission 195, to an output shaft of the transmission 195, or to another component. A clutch 200 may be implemented to couple the electric motor 198 to the transmission 195 and to decouple the electric motor 198 from the transmission 195. One or more gearing devices may be implemented between an output of the electric motor 198 and an input of the transmission 195 to provide one or more predetermined gear ratios between rotation of the electric motor 198 and rotation of the input of the transmission 195. In various implementations, the electric motor 198 may be omitted.

The ECM 114 starts the engine 102 via a starter motor 202. The ECM 114 or another suitable module of the vehicle engages the starter motor 202 with the engine 102 for an engine startup event. For example only, the ECM 114 may engage the starter motor 202 with the engine 102 when a key ON command is received. A driver may input a key ON command, for example, via actuating one or more ignition keys, buttons, and/or switches of the vehicle or of a key fob of the vehicle. The starter motor 202 may engage a flywheel coupled to the crankshaft or one or more other suitable components that drive rotation of the crankshaft.

The ECM 114 may also start the engine in response to an auto-start command during an auto-stop/start event or to an engine start command for a sailing event. Auto-stop/start events include shutting down the engine 102 while the vehicle is stopped, the driver has depressed the brake pedal, and the driver has not input a key OFF command. An auto-start command may be generated while the engine 102 is shut down for an auto-stop/start event, for example, when a driver releases the brake pedal and/or depresses the accelerator pedal.

Sail events may include the ECM 114 shutting down the engine 102 when the vehicle is moving (e.g., vehicle speed greater than a predetermined speed, such as 50 miles per hour), the driver is not actuating the accelerator pedal, and the driver has not input a key OFF command. An engine start command may be generated while the engine 102 is shut down for a sail event, for example, when a driver depresses the accelerator pedal. The driver may input a key OFF command, for example, via actuating the one or more ignition keys, buttons, and/or switches, as discussed above.

A starter motor actuator, such as a solenoid, may actuate the starter motor 202 into engagement with the engine 102. For example only, the starter motor actuator may engage a starter pinion with a flywheel coupled to the crankshaft. In various implementations, the starter pinion may be coupled to the starter motor 202 via a driveshaft and a one-way clutch. A starter actuator module 204 controls the starter motor actuator and the starter motor 202 based on signals from a starter control module, as discussed further below. In various implementations, the starter motor 202 may be maintained in engagement with the engine 102.

In response to a command to start the engine 102 (e.g., an auto-start command, an engine start command for an end of a sail event, or when a key ON command is received), the starter actuator module 204 supplies current to the starter motor 202 to start the engine 102. The starter actuator module 204 may also actuate the starter motor actuator to engage the starter motor 202 with the engine 102. The starter actuator module 204 may supply current to the starter motor 202 after engaging the starter motor 202 with the engine 102, for example, to allow for teeth meshing.

The application of current to the starter motor 202 drives rotation of the starter motor 202, and the starter motor 202 drives rotation of the crankshaft (e.g., via the flywheel). The period of the starter motor 202 driving the crankshaft to start the engine 102 may be referred to as engine cranking.

The starter motor 202 draws power from the battery 208 to start the engine 102. Once the engine 102 is running after the engine startup event, the starter motor 202 disengages or is disengaged from the engine 102, and current flow to the starter motor 202 may be discontinued. The engine 102 may be considered running, for example, when an engine speed exceeds a predetermined speed, such as a predetermined idle speed. For example only, the predetermined idle speed may be approximately 700 revolutions per minute (rpm) or another suitable speed. Engine cranking may be said to be completed when the engine 102 is running.

A generator 206 converts mechanical energy of the engine 102 into alternating current (AC) power. For example, the generator 206 may be coupled to the crankshaft (e.g., via gears or a belt) and convert mechanical energy of the engine 102 into AC power by applying a load to the crankshaft. The generator 206 rectifies the AC power into DC power and stores the DC power in the battery 208. Alternatively, a rectifier that is external to the generator 206 may be implemented to convert the AC power into DC power. The generator 206 may be, for example, an alternator. In various implementations, such as in the case of a belt alternator starter (BAS), the starter motor 202 and the generator 206 may be implemented together.

Figure 2:
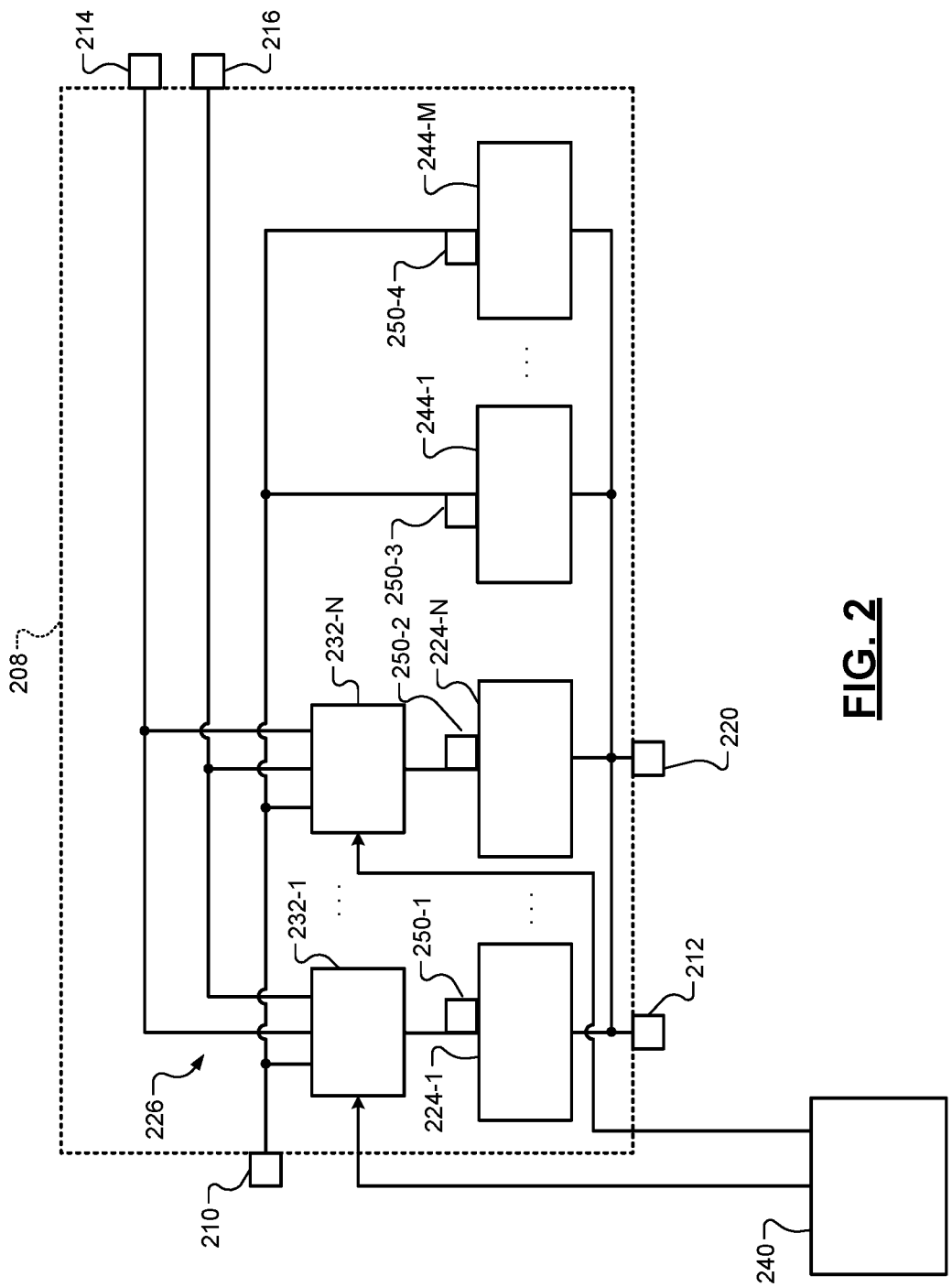
FIG. 2 is an example block diagram of a battery in accordance with an example implementation of the present disclosure.

FIG. 2 is a functional block diagram of an example electrical system of the vehicle. The electrical system includes the battery 208 discussed above. The battery 208 has two or more different sets of output terminals to provide two or more direct current (DC) operating voltages. Each set of output terminals includes a positive terminal and a negative terminal. Two or more sets of output terminals may share a negative terminal, or the negative terminals of two or more sets may be internally connected within the battery 208 or externally connected. For example only, the battery 208 may have a first positive (e.g., 48 Volt (V)) terminal 210, a first negative terminal 212, a second positive (e.g., a first 12 V) terminal 214, a third positive (e.g., a second 12 V) terminal 216, and a second negative terminal 220. While the example of the battery 208 having a 48 V operating voltage and two 12 V operating voltages is provided, the battery 208 may have one or more other operating voltages, such as only two 12 V operating voltages, only two 48 V operating voltages, two 48 V operating voltages and a 12 V operating voltage, or a combination of two or more other suitable operating voltages.

The battery 208 includes a plurality of individual batteries, such as a first battery 224-1, . . . , and an N-th battery 224-N ("batteries 224") of an adjustable battery system 226, where N is an integer greater than or equal to 2. In various implementations, N may be equal to 6, 8, 10, or 12. Each of the batteries 224 may include one or more battery cells, and each of the batteries 224 may be separately replaceable within the battery 208. For example only, each of the batteries 224 may be an individually housed 12 V DC battery. The ability to individually replace the batteries 224 may enable the battery 208 to include a shorter warranty period and have a lower warranty cost. The batteries 224 are also individually isolatable, for example, in the event of a fault in a battery module. In various implementations, the battery 208 may have the form factor of a standard automotive grade 12 V battery. In some implementations, the batteries 224 are mechanically separate battery packs and/or electrically isolated.

Each of the batteries 224 has its own separate capacity (e.g., in amp hours, Ah). The battery 208 includes a plurality of switches, such as first switches 232-1, . . . , N-th switches 232-N (collectively "switches 232"). The switches 232 enable the batteries 224 to be connected in series, parallel, or combinations of series and parallel to provide desired output voltages and capacities at the output terminals.

A switch resistance modulation module 240 controls the switches 232 to provide desired output voltages and capacities at the output terminals. The switch resistance modulation module 240 controls a resistance of the switches 232 to vary the capacity provided at the output terminals based on a present operating mode of the vehicle, as discussed further below.

In some examples, the battery 208 may include one or more individual standard batteries, such as a first battery 244-1, . . . , and an M-th battery 244-M ("batteries 244"), where M is an integer greater than or equal to 2. As used herein, a "standard" battery corresponds to a non-adjustable battery having a fixed output voltage, such as an individual cell or module comprising a plurality of cells. The electrical system also includes one or more sensors 250-1 through 250-4. The sensors 250-1 through 250-4 may comprise current sensors, temperature sensors, voltage sensors, or the like, that measure battery parameters and provide signals indicative of the battery parameters.

Figure 3A:
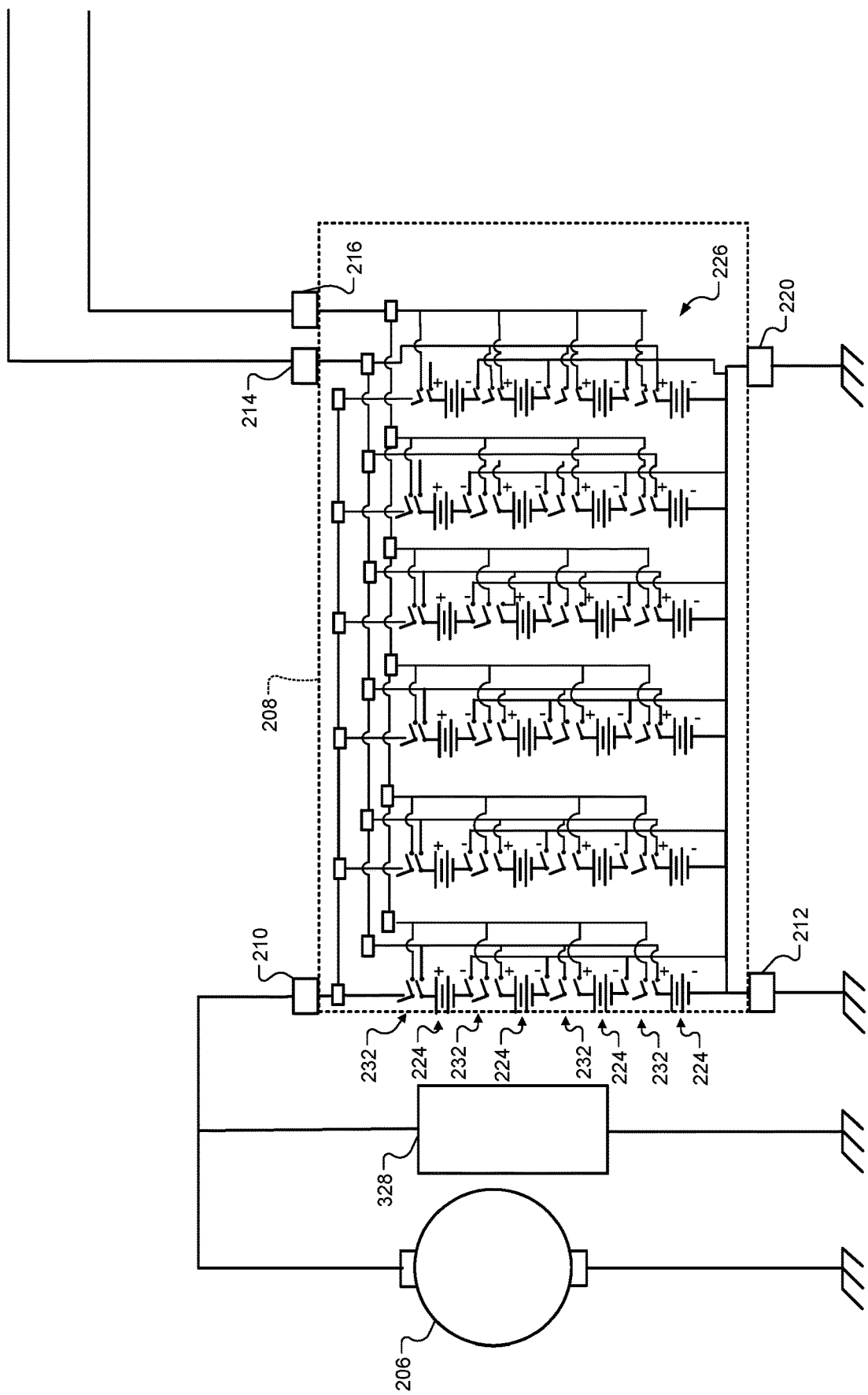
FIG. 3A is an example schematic diagram of a battery system in accordance with an example implementation of the present disclosure.
Figure 3B:
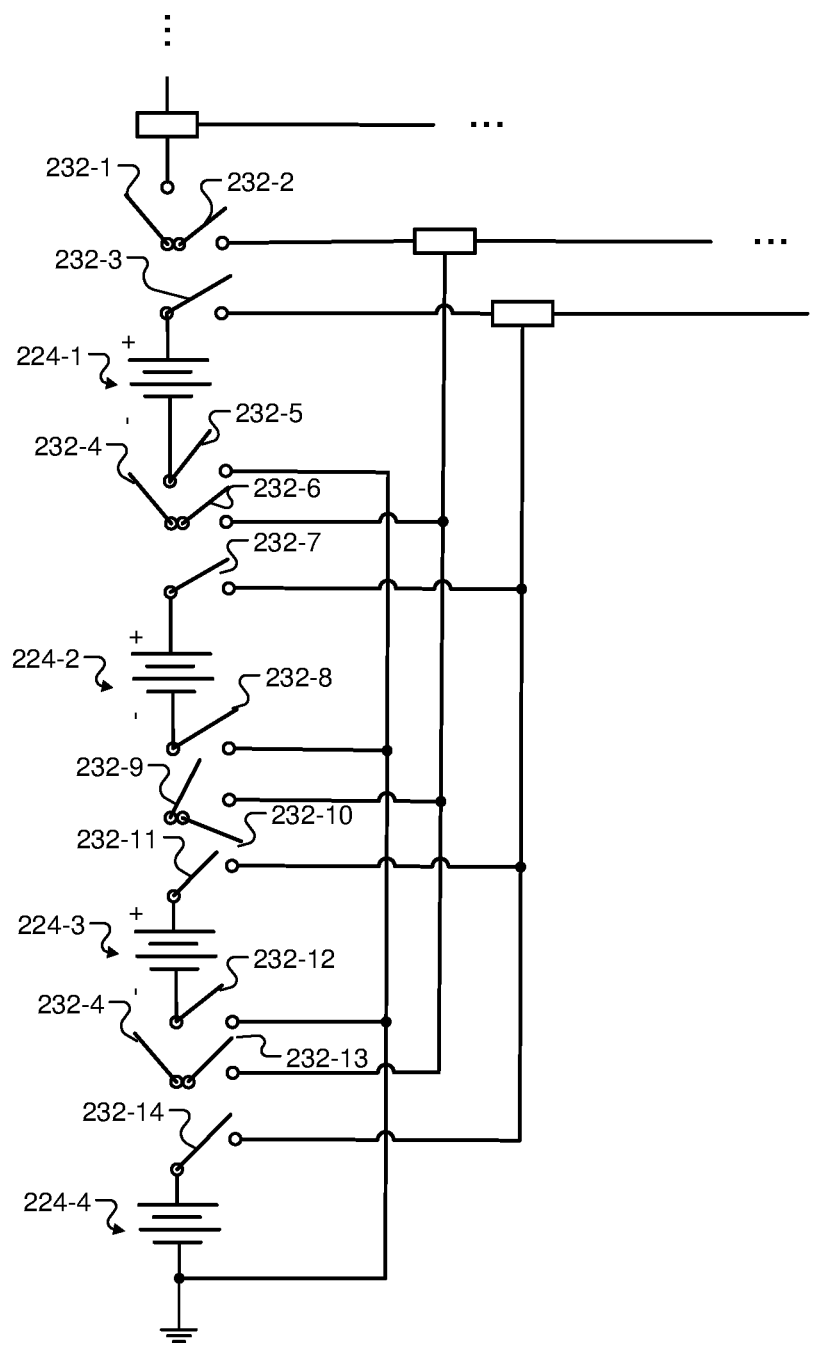
FIG. 3B is a schematic diagram of a battery-switch connection of the battery system according to an example implementation of the present disclosure.

FIGS. 3A and 3B are schematics including an example implementation of the adjustable battery system 226 of the battery 208. As shown, sets of 4 of the batteries 224 (e.g., 12 V batteries) are connectable in series (via ones of the switches 232) to the first positive terminal 210 and the first negative terminal 212 to provide a first output voltage (e.g., 48 V). Individual ones of the batteries 224 can be connected (via ones of the switches 232) to the second positive terminal 214 or the third positive terminal 216 and the second negative terminal 220 to provide a second output voltage (e.g., 12 V) at the second and third positive terminals 214 and 216. How many of the batteries 224 are connected to the first positive terminal 210, the second positive terminal 214, and the third positive terminal 216 dictates the portions of the overall capacity of the battery 208 available at each of the positive terminals.

A second set of vehicle electrical components can operate using another one of the two or more operating voltages of the battery 208. For example, the second set of vehicle electrical components may be connected to the first positive terminal 210. The second set of vehicle electrical components may include, for example but not limited to, the generator 206 and various electrical loads, such as 48 V loads 328. The generator 206 may be controlled to recharge the battery 208. FIG. 3B is a schematic of a first set of batteries 224-1 through 224-4 connectable in series via one or more switches 232-1 through 232-14.

Each of the switches 232 may be an insulated gate bipolar transistor (IGBT), a field effect transistor (FET), such as a metal oxide semiconductor FET (MOSFET), or another suitable type of switch. In various implementations, a resistance of each switch 232 can be adjusted based on one or more conditions of the powertrain system 100. Thus, each switch 232 can comprise a potentiometer, a rheostat, or the like.

Figure 4:
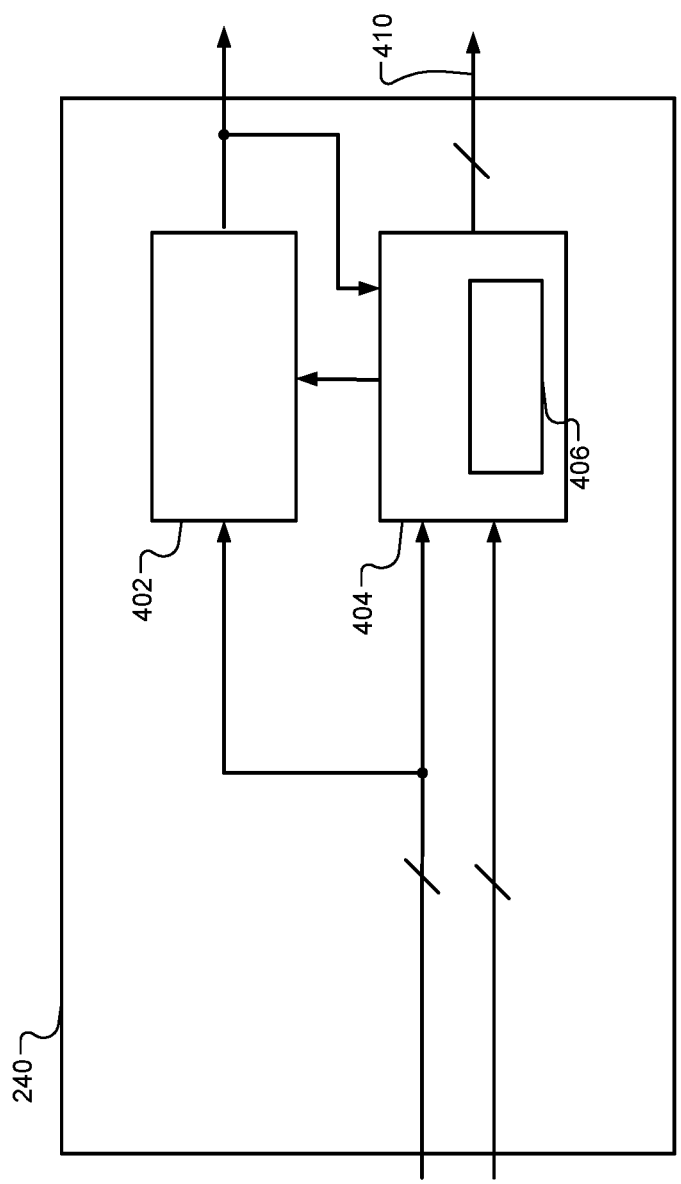
FIG. 4 is an example block diagram of a battery control system in accordance with an example implementation of the present disclosure.

FIG. 4 illustrates a switch resistance modulation module 240 that modulates the resistances of one or more switches 232. As shown, the switch resistance modulation module 240 includes a verification module 402, a resistance determination module 404, and a look-up table 406.

The resistance determination module 404 receives battery parameter signals indicative of one or more battery parameters from one or more battery sensors, a battery management system, or the like. The battery parameters can include, but are not limited to, battery temperature, battery charge, battery current, battery voltage, or the like. The resistance determination module 404 also receives control signals from one or more vehicle modules, such as the ECM 114, the hybrid control module (HCM) 196, a battery management module (BMM), a body control module, or the like.

The resistance determination module 404 determines a resistance value for one or more switches 232 and generates a modulation signal based on the determination. The modulation signal is then provided to the selected switch 232 via a bus 410 to modulate a resistance of the selected switch 232. The resistance may range from zero (0) ohms to an open circuit include discrete resistance values therebetween. For example, the modulation signal may adjust the resistance of a switch 232 to a first value (i.e., fifty (50) ohms) for a first time period and then adjust the resistance of the switch to a second value (i.e., five hundred (500) Mega-ohms) for a second time period. Thus, it is understood that the modulation signal can modulate the signal can adjust the resistance of the switch to a desired resistance ranging between zero ohms and an open circuit.

Figure 5C:
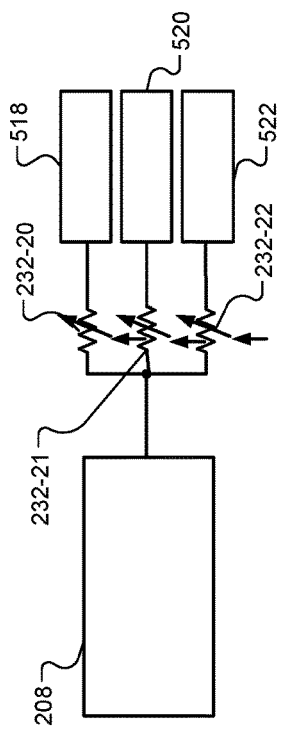
FIGS. 5A through 5D are example schematic diagrams of battery-switch connections according to an example implementation of the present disclosure.
Figure 5D:
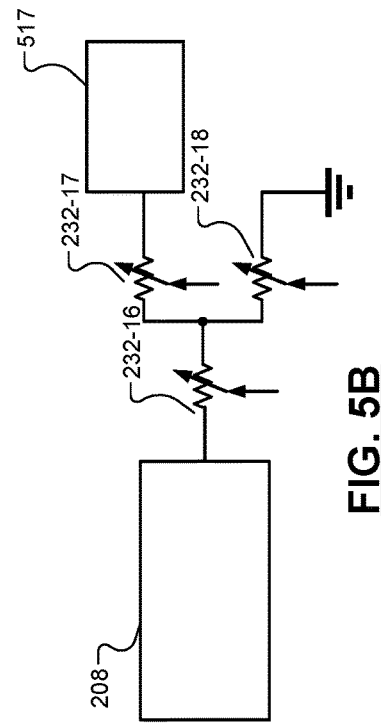
Figure 5A:
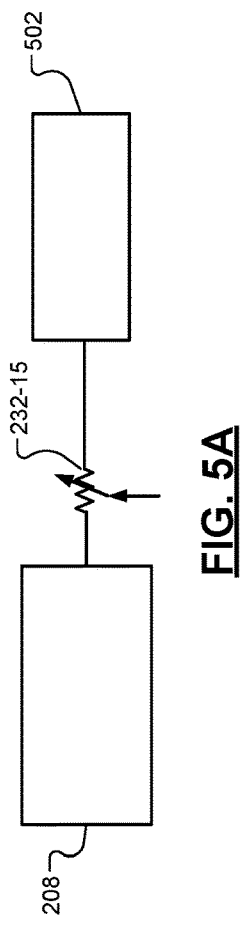

FIG. 5A illustrates an example schematic of a switch 232-15 connected between the battery 208 and a rechargeable energy source 502. It is understood that the rechargeable energy source 502 may comprise a generator, an external charger, or the like. In this implementation, the switch resistance modulation module 240 dynamically modulates the resistance of the switch 232-15 to mitigate lithium plating based on the battery parameters and/or the control signals and/or ensure charging limits and discharging limits are adhered to. Based on the battery parameter signals and/or the control signals, the resistance determination module 404 dynamically generates the modulation signal to control the resistance of the switch 232-15.

In an implementation, the resistance determination module 404 accesses the look-up table 406 using the battery parameter signals and/or the control signals to determine the desired resistance for the switch 232-15. The look-up table 406 stores one or more look-up tables that include a resistance parameter to provide the resistance determination module 404 based on the received signals. Tables 1 and 2 illustrate an example look-up table in which Table 1 is associated with a first set of batteries within a vehicle and Table 2 is associated with a second set of batteries within the vehicle.

TABLE 1

| ECU | Limit Type | | |
|---|---|---|---|
| | Safety | Reliability | Performance |
| Battery Mgmt | 100 | 90 | 80 |
| Engine Controller | 110 | 100 | 95 |
| Body Controller | 80 | 70 | 50 |

TABLE 2

| ECU | Limit Type | | |
|---|---|---|---|
| | Safety | Reliability | Performance |
| Battery Mgmt | 90 | 80 | 60 |
| Engine Controller | 95 | 85 | 70 |
| Body Controller | 80 | 70 | 50 |

The resistance determination module 240 can access the look-up tables to determine the switch resistance for a particular switch 232 associated with a particular set of batteries. For example, based on the number of battery sets within the vehicle, the resistance determination module 240 establishes the maximum allowable value for each block and then establishes the least common value among the battery sets to determine the switch resistance.

In an implementation, Tables 1 and 2 are based on current in Amperes (Amps) and is applied to a regenerative braking event. The resistance determination module 240 determines the switch resistances for the switches 232 associated with a particular set of batteries. The received battery parameters may, in part, indicate the "Limit Type." For example, the battery parameters, such as battery temperature and/or state of charge (SoC), may be used to determine the operating condition (e.g., "Safety," "Reliability," "Performance").

In this implementation, a vehicle is operating in "Performance" mode and the engine control module targets 95 Amps if the first set of batteries (Table 1) is connected. If the second set of batteries (Table 2) is connected, the engine control module would target 70 Amps. Based on these values, the resistance determination module 240 establishes the maximum allowable value as 95 Amps and 70 Amps and then establishes the least common value as 70 Amps (Table 2). Based on the least common value, the resistance determination module 240 determines (e.g., selects) resistances such that the first battery set and the second battery set provide 70 Amps as established by the least common value.

Figure 5B:
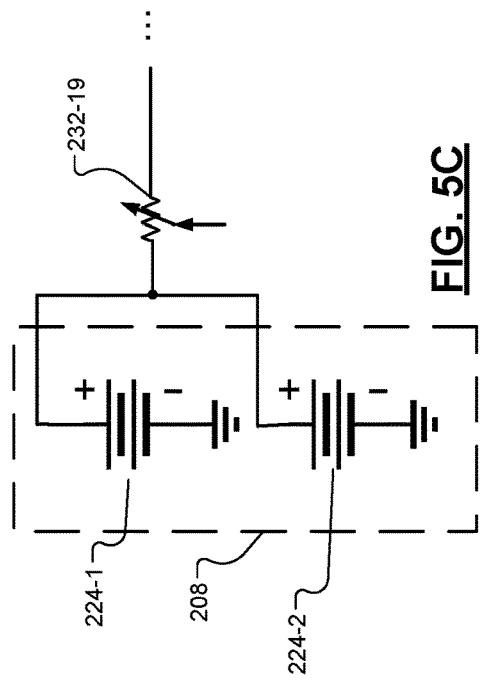

FIG. 5B illustrates an example schematic in which the resistance determination module 404 modules the resistance of the switches 232-16, 232-17, 232-18 to create a discharge path between the battery 208 and ground. For example, based on the battery parameters and the control signals, the resistance determination module 404 modulates the resistance of the switches 232-16, 232-17, 232-18 so that stored energy within the battery 208 is discharged to ground (instead of to the load 517) to mitigate thermal runaway in specific battery temperature and/or state-of-charge environments.

FIG. 5C illustrates an example schematic in which the resistance determination module 404 modules the resistance of the switch 232-19 to create current flow between a first battery 224-1 and a second battery 224-2 to warm one individual cell using power discharged from another individual cell within the battery 208.

FIG. 5D illustrates an example schematic in which the resistance determination module 404 modules the resistance of the switches 232-20, 232-21, 232-22 to verify one or more operating conditions corresponding to the battery 208. For instance, one or more switches 232-20, 232-21, 232-22 function as an open circuit so that current flows in a particular path between the battery 208 and the selected load 518, 520, 522.

In an implementation, the resistance determination module 404 communicates with the verification module 406 to determine one or more switches to modulate 232. For example, the verification module 406 may include one or more predetermined modulation protocols used to specify an order for controlling a switch resistance.

In an implementation, the verification module 406 causes the resistance determination module 404 to open one or more parallel paths and to vary a resistance of a single switch 232. For example, the resistance determination module 404 modulates the resistance of switches 232-20, 232-21 such that these switches function as an open circuit while modulating the resistance of the switch 232-22. As the resistance is modulated, the verification module 406 receives the battery parameter signals from the battery parameter receiving module 402.

Based on the received battery parameter signals and the modulated resistance value provided by the resistance determination module 404, the verification module 406 can verify zero current offsets and/or determine calibration values of current sensors associated with the battery 208 and/or the loads 518, 520, 522. In some instances, the verification module compares the measured current with programmed current values to determine whether a difference is greater than a predetermined threshold.

In some instances, the verification module 406 and the resistance determination module 404 modulate the resistances of each switch 232 to verify switch and/or load functionality. For example, the verification module 406 can cause the resistance determination module 404 to cause a first switch 232 to operate as a closed switch while the remaining switches 232 operate as an open switch. The verification module 406 can compare the received battery parameters signals with predetermined thresholds to determine functionality and/or state of health (SoH) associated with the closed switch and/or connected load.

The verification module 406 can output a verification signal indicative of the determined functionality and/or SoH. The verification signal can be sent to the ECM 114, which can be used for diagnostic purposes. Additionally, the verification module 406 can generate an alert when the battery parameters are outside the predetermined threshold.

In some implementations, the resistance determination module 404 modulates the resistance of a subset of switches 232 or all of the switches 232 such that the switches function as an open circuit to reset high parasitic loads. For example, based on the battery parameter signals, the resistance determination module 404 can determine that one or more battery parameters deviate from a corresponding battery parameter threshold. In response, the resistance determination module 404 can temporarily reset each of the switches 232 such that the switches 232 function as open circuits to mitigate parasitic battery drain.

Figure 6:
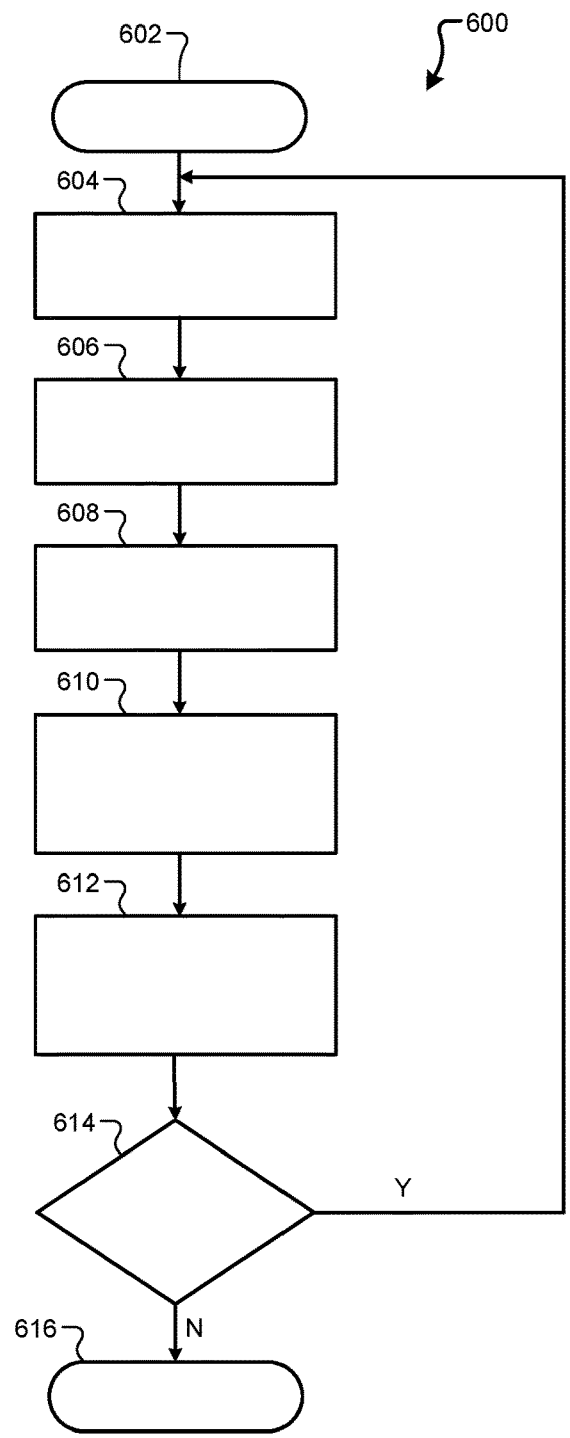
FIG. 6 is a flow diagram illustrating an example method for modulating a resistance of a switch using a battery control system according to an example implementation of the present disclosure.

FIG. 6 is a flow diagram illustrating an example method 600 for modulating a resistance of one or more switches 232 within a battery 208. The method 600 is described in the context of the modules included in the example implementation of the switch resistance modulation module 240 shown in FIG. 4 in order to further describe the functions performed by those modules. However, the particular modules that perform the steps of the method may be different than the description below and/or the method may be implemented apart from the modules of FIG. 4. For example, the method may be implemented by a single module.

The method 600 begins at 602. At 604, one or more battery parameter signals are received at the resistance determination module. At 606, one or more control signals are received at the resistance determination module. The resistance determination module 404 accesses the look-up table 406 at 608 based on the battery parameters and the control signals. Based on the received signals, the resistance determination module 404 determines a resistance parameter using the look-up table 406 at 610. In an implementation, the resistance determination module 404 accesses the look-up table to determine the lowest common value and calculates the resistance parameter based on the lowest common value. The resistance parameter may correspond to the voltage of the battery 208 divided by the lowest common value of the current.

At 612, the resistance determination module 404 generates a modulation signal for one or more switches 232 based on the resistance parameter. At 614, the resistance determination module 404 determines whether vehicle is still "On," or operating. If the vehicle is still on, the method 600 returns to 604. If the vehicle is not operating, the method 600 ends at 616.

Figure 7:
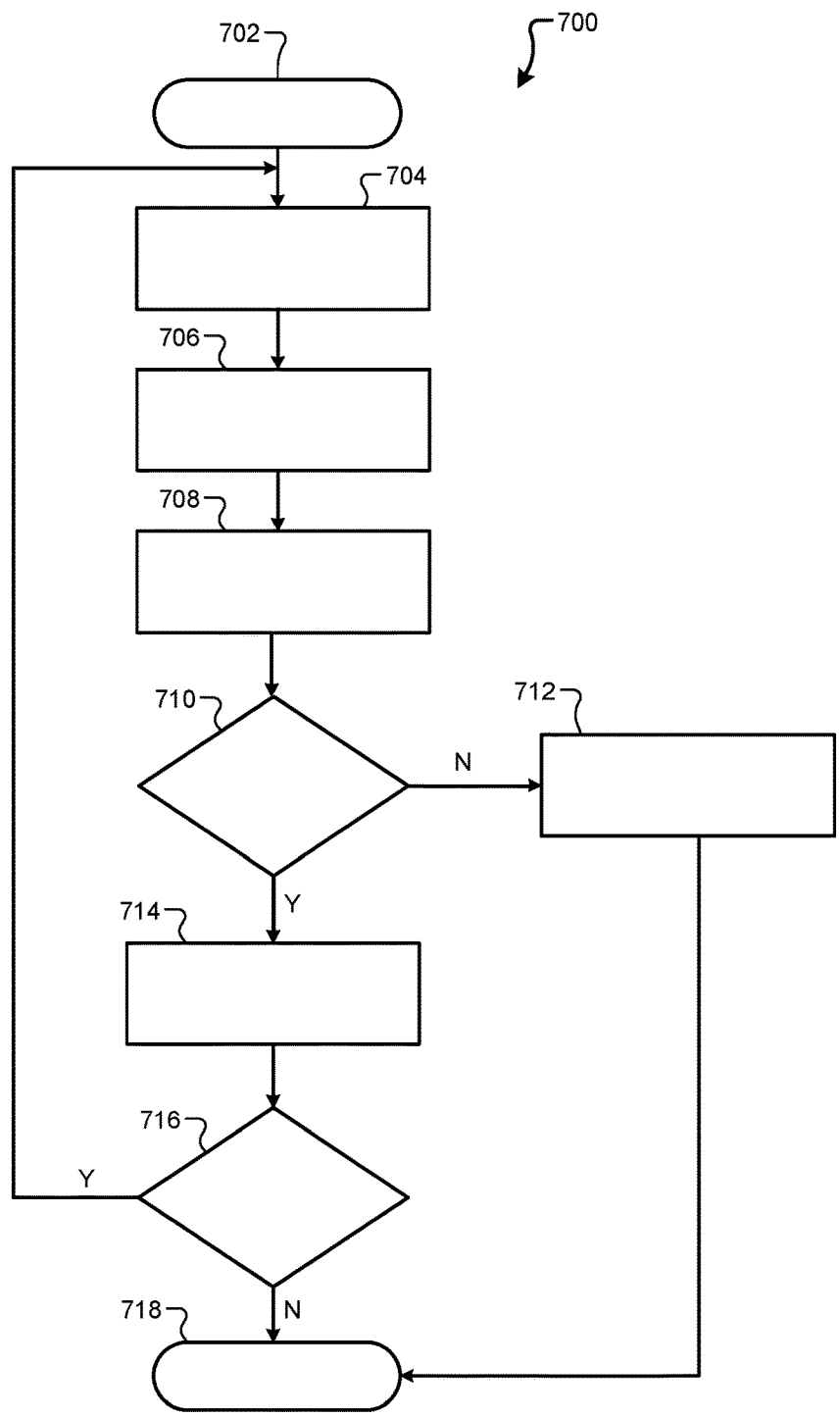
FIG. 7 is a flow diagram illustrating an example method for modulating a resistance of a switch using a battery control system according to an example implementation of the present disclosure.

FIG. 7 is a flow diagram illustrating an example method 700 for modulating a resistance of one or more switches 232 within a battery 208. The method 700 is described in the context of the modules included in the example implementation of the switch resistance modulation module 240 shown in FIG. 4 in order to further describe the functions performed by those modules. However, the particular modules that perform the steps of the method may be different than the description below and/or the method may be implemented apart from the modules of FIG. 4. For example, the method may be implemented by a single module.

The method 700 begins at 702. At 704, one or more battery parameter signals are received at the battery parameter receiving module 402. At 706, one or more control signals are received at the control data receiving module 404. The resistance determination module 404 communicates with the verification module 406 at 708 to modulate the switch resistance of one or more switches 232 according to the modulation protocol stored in the verification module 406.

The verification module 406 determines whether one or more parameters corresponding to the modulated resistance are within the predetermined threshold at 710. For example, the verification module 406 compares one or more received battery parameters corresponding to the modulated resistance to corresponding predetermined thresholds. At 712, the verification module 406 generates an alert indicating that one or more parameters are outside the predetermined threshold when the comparison indicates the parameter is outside the predetermined threshold.

At 714, the verification module 406 records the parameters when the comparison indicates the parameter is outside the predetermined threshold. The resistance determination module 404 determines whether the vehicle is "On" at 716. If the vehicle is "On," the method 700 returns to 708. Otherwise, the method 700 ends at 718.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A battery control system, comprising:
    a plurality of batteries;
    a first terminal;
    a second terminal;
    a third terminal;
    a plurality of switches configured to connect a first battery of the plurality of batteries to and from the first terminal and the third terminal and to connect a second battery of the plurality of batteries to and from the second terminal and the third terminal; and
    a switch resistance modulation module configured to modulate a resistance of at least one switch of the plurality of switches between zero ohms and infinity ohms based on a battery parameter and a control signal.

2. The battery control system as recited in claim 1, wherein the switch resistance modulation module is configured to modulate the resistance of the at least one switch to direct current flow between the first battery and the second battery.

3. The battery control system as recited in claim 1, wherein the switch resistance modulation module is configured to modulate the resistance of the at least one switch to mitigate lithium plating.

4. The battery control system as recited in claim 1, wherein the control signal is generated by an engine control module.

5. The battery control system as recited in claim 1, wherein the switch resistance modulation module is further configured to verify one or more operating conditions corresponding to the battery, wherein the verification is based on a comparison of the battery parameters to a predetermined threshold.

6. The battery control system as recited in claim 1, wherein the plurality of switches comprise at least one of an insulated gate bipolar transistor (IGBT) or a field effect transistor (FET).

7. The battery control system as recited in claim 1, wherein the switch resistance modulation module includes a first look-up table that indexes current values associated with the first battery and a second look-up table that indexes current values associated with the second battery.

8. The battery control system as recited in claim 7, wherein the switch resistance modulation module is configured to generate a modulation signal based on a least common value between the first look-up table and the second look-up table.

9. A battery control system, comprising:
    a plurality of batteries;
    a first terminal;
    a second terminal;
    a third terminal;
    a plurality of switches configured to connect a first battery of the plurality of batteries to and from the first terminal and the third terminal and to connect a second battery of the plurality of batteries to and from the second terminal and the third terminal; and
    a switch resistance modulation module configured to modulate a resistance of at least one switch of the plurality of switches between zero ohms and infinity ohms based on a battery parameter and a control signal, wherein the switch resistance modulation module includes a first look-up table that indexes current values associated with the first battery and a second look-up table that indexes current values associated with the second battery, wherein the switch resistance module is configured to modulate the resistance according to a least common value based on the current values indexed in the first look-up table and the current values indexed in the second look-up table.

10. The battery control system as recited in claim 9, wherein the switch resistance modulation module is configured to modulate the resistance of the at least one switch to direct current flow between the first battery and the second battery.

11. The battery control system as recited in claim 9, wherein the switch resistance modulation module is configured to modulate the resistance of the at least one switch to mitigate lithium plating.

12. The battery control system as recited in claim 9, wherein the control signal is generated by an engine control module.

13. The battery control system as recited in claim 9, wherein the switch resistance modulation module is further configured to verify one or more operating conditions corresponding to the battery, wherein the verification is based on a comparison of the battery parameters to a predetermined threshold.

14. The battery control system as recited in claim 9, wherein the plurality of switches comprise at least one of an insulated gate bipolar transistor (IGBT) or a field effect transistor (FET).

15. A method, comprising:
receiving a battery parameter;
receiving a control signal; and
modulating a resistance of at least one switch of a plurality of switches between zero ohms and infinity ohms based on the battery parameter and the control signal,
wherein the plurality of switches are configured to connect a first battery of a plurality of batteries to and from a first terminal and a third terminal and to connect a second battery of the plurality of batteries to and from a second terminal and the third terminal.

16. The method as recited in claim 15, further comprising modulating the resistance of the at least one switch to direct current flow between the first battery and the second battery.

17. The method as recited in claim 15, wherein the modulating the resistance of the at least one switch mitigates lithium plating.

18. The method as recited in claim 15, wherein the control signal is generated by an engine control module.

19. The method as recited in claim 15, further comprising verifying one or more operating conditions corresponding to the battery by comparing the battery parameters to a predetermined threshold.

20. The method as recited in claim 15, wherein the plurality of switches comprise at least one of an insulated gate bipolar transistor (IGBT) or a field effect transistor (FET).

* * * * *